Figure 1:
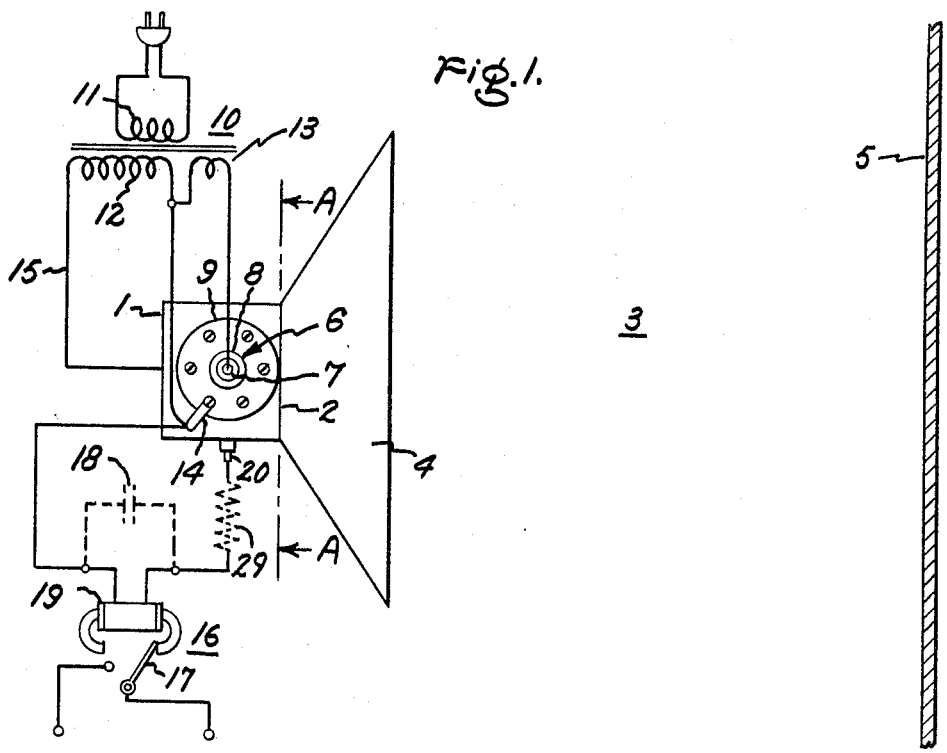

Inventor:
Charles L. Andrews,
by John P. Dellitt
His Attorney.

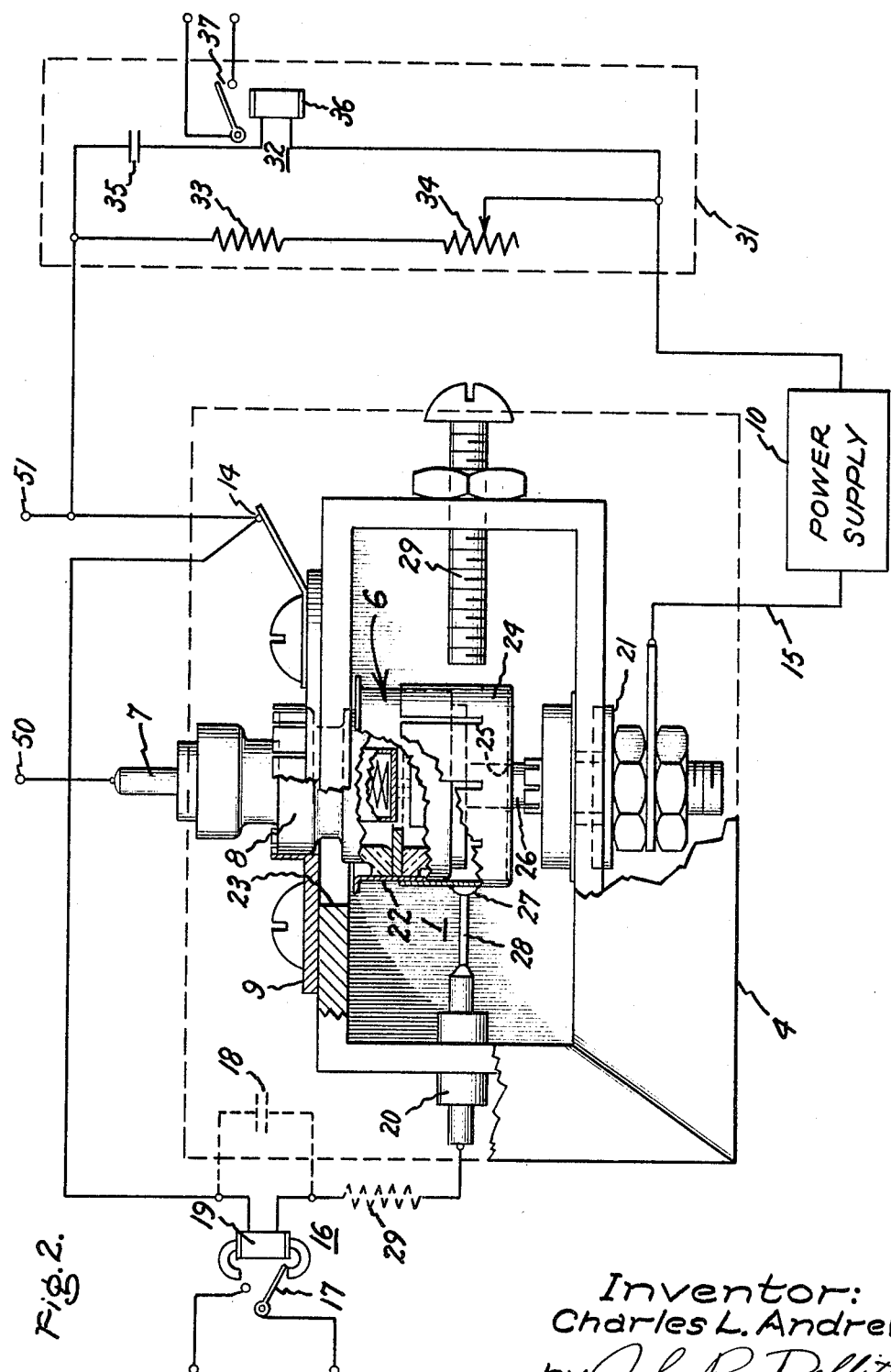

Oct. 11, 1966

C. L. ANDREWS
3,278,922
POSITION AND MOTION DETECTOR

Filed Nov. 14, 1963

4 Sheets-Sheet 4

Inventor:
Charles L. Andrews,
by John P. Dellett
His Attorney.

United States Patent Office 3,278,922
Patented Oct. 11, 1966

3,278,922
POSITION AND MOTION DETECTOR
Charles L. Andrews, Albany, N.Y., assignor to General Electric Company, a corporation of New York
Filed Nov. 14, 1963, Ser. No. 323,746
8 Claims. (Cl. 340—258)

This invention relates to a microwave position and motion detector and particularly to a simplified and economical detector of this type employing a minimum number of component parts.

A microwave position and motion detector as presently contemplated is based upon a high frequency oscillator, the circuit constants of which are affected by oscillator loading. Systems of this type are known wherein a high frequency antenna couples energy from such an oscillator to a room or other area wherein motion is to be detected. For example, it may be desired to detect the entrance of intruders. Movement in the field established by the antenna changes the antenna loading thereby producing a change in certain voltage levels within the oscillator. Since these voltage changes are usually small, a detector and amplifier are conventionally required for the purpose of detecting such changes in voltage level and translating them into a signal indicating the said movement. Systems of this type are frequently viewed as a transmitter, and a receiver employing a common antenna. The usual system is inclined to be somewhat expensive, requiring amplifiers, power supplies and other auxiliary equipment in addition to the basic oscillator. It is an object of the present invention to provide a simplified position and motion detector requiring a minimum of auxiliary equipment. It is another object of the present invention to provide a simplified position and motion detector wherein current changes in a high frequency oscillator are sufficient for directly operating a relay or other utilization device.

In accordance with the present invention, a position and motion detector employs a microwave oscillator wherein a small oscillator vacuum tube is located in a resonant cavity forming a resonant circuit for the oscillator. The resonant cavity is open to the area wherein the position and/or motion of objects is to be detected and preferably this opening is provided with an output horn for matching the cavity to such area. If an object appears, a wave reflected to the oscillator cavity interferes with the initial wave propagated from the cavity. The resulting standing wave extends to gaps of the vacuum tube and reacts with the electron beam within the tube to alter the grid and plate currents to a considerable extent. The action is similar to that of the Fabry-Perot interferometer in regard to light, that is, the microwave case is similar to a multiple beam interferometer for light waves. The changes in oscillator grid and plate current, due to the direct coupling achieved by the standing wave extending into the cavity and tube, are sufficient to operate a magnetic relay without the use of amplifiers. Moreover, a special power supply is not required, but the oscillator may operate directly from an alternating current line employing simply an intermediate transformer to supply the correct voltages. This position and motion detector has been found useful not only in detecting the presence of unwanted objects and the like but also for various other purposes such as detection of change in position of steel sheeting passing through a rolling mill or the presence of moisture in clothes dryers.

Figure 3A:
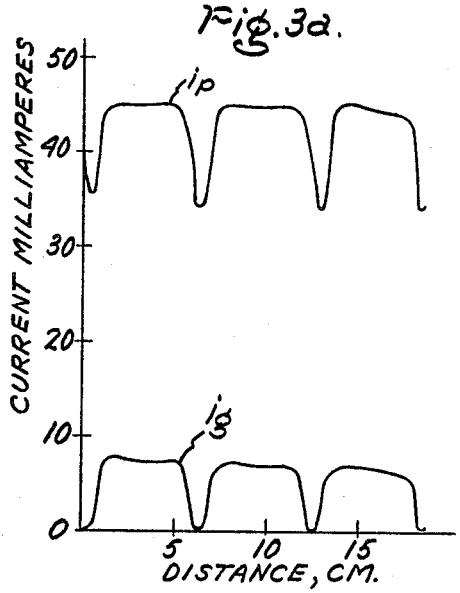
Figure 3B:
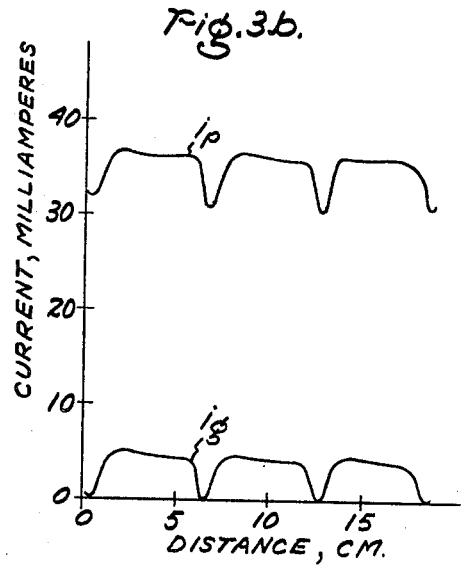
Figure 3C:
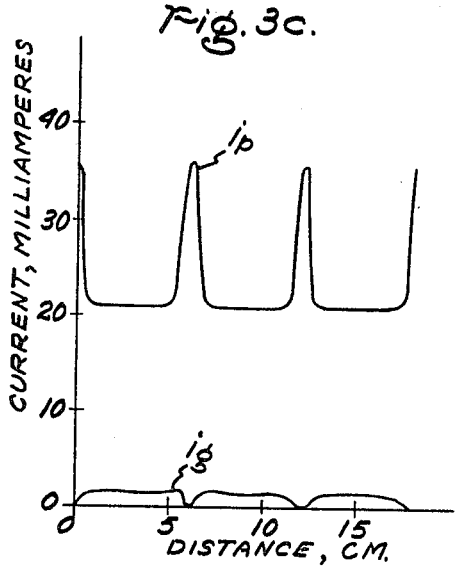
Figure 4:
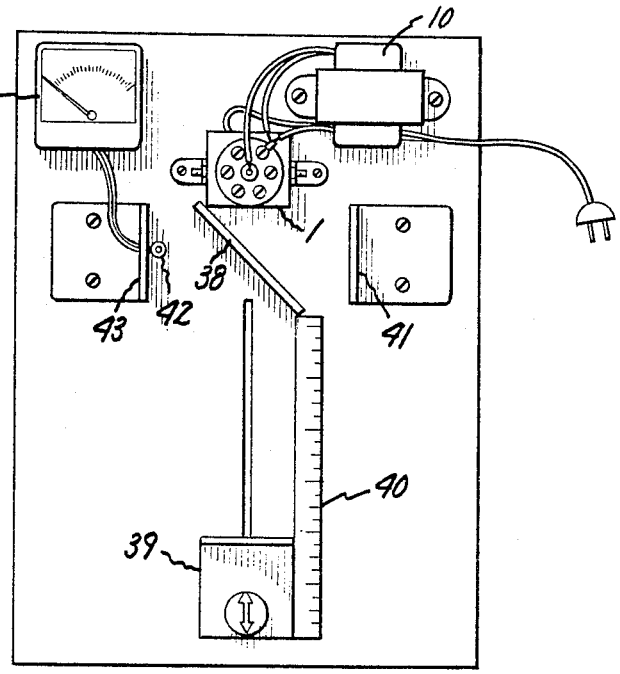
Figure 5:
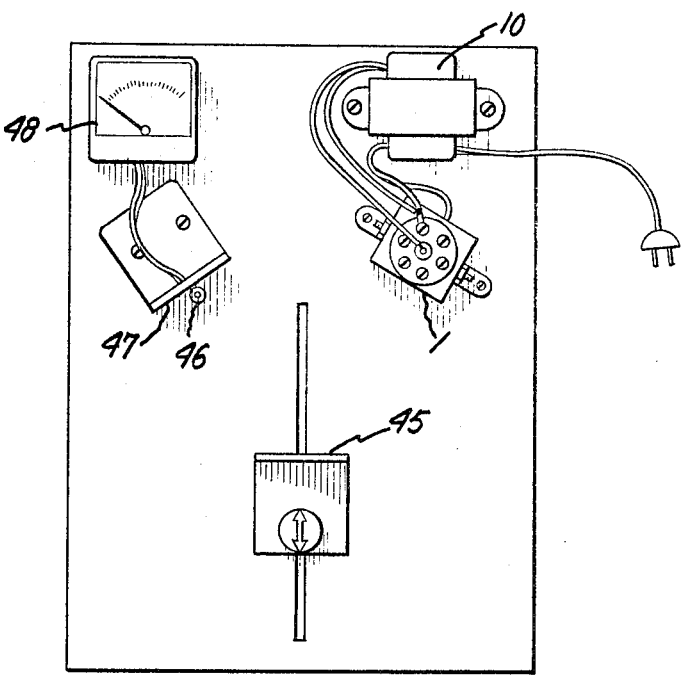

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a schematic diagram of an embodiment of a position and motion detector in accordance with the present invention, including a plan view of principal components thereof, FIG. 2 is a schematic diagram in accordance with a similar embodiment of the present invention and including a cross-sectional view of the oscillator cavity, FIGS. 3a–c includes plots of grid and anode current vs. the distance of a reflecting object from the oscillator cavity, FIG. 4 is a plan view of a microwave Michelson's interferometer apparatus in accordance with the present invention, and FIG. 5 is a plan view of a microwave Lloyd's mirror apparatus in accordance with the present invention.

Referring to FIG. 1, illustrating a principal embodiment of the present invention, a rectangular waveguide cavity 1 open on side 2 is coupled to the surrounding region 3 with a flared horn 4 of rectangular configuration and tapered from the rectangular cavity dimensions to somewhat larger dimensions on the order of between one and four wavelengths across. The purpose of the apparatus is to detect the presence and/or motion of an object 5 here illustrated as a metal sheet facing horn 4. Object 5 may, for example, comprise sheet steel traversing a rolling mill. Cavity 1 includes an oscillator tube 6 having a filament connection 7 and a cylindrical cathode terminal 8 grounded to the cavity wall by means of ground plate 9. The remaining tube electrode connections may be more clearly discerned in connection with FIG. 2.

In FIG. 1 a power supply 10 comprises an alternating current transformer having a primary 11 for connection to a common source of A.C. supply, a first high voltage secondary 12 and a second or low voltage filament supply secondary 13. Inasmuch as one filament terminal of the tube is internally connected to the tube cathode, secondary 13 is shown coupled between filament terminal 7 and a point of common reference potential or ground level 14. One side of high voltage secondary 12 is also grounded while the remaining lead, 15, is connected to the tube's anode electrode on the underside of the cavity.

The utilization circuit may include a polarized or a permanent field type relay 16 having normally open contacts 17, and a capacitor 18 coupled across its operating coil 19 to prevent contact chatter when the supply source is alternating current. The operating coil is included in the grid circuit of tube 6, being interposed between grid feedthrough connector 20 extending through the side wall of the cavity, and the point of common reference potential, 14.

The internal construction of cavity 1 and the placement of tube 6 therein is more clearly illustrated in FIG. 2 wherein the view of cavity 1 is taken at A—A in FIG. 1, that is at the open side of the cavity. As may be seen from FIG. 2 the cavity is rectangular in shape and supports tube 6 between the narrow walls thereof. The waveguide cavity is approximately one-half wavelength wide at the operating frequency and approximately one-quarter wavelength high as well as being one-quarter wavelength in depth between the back wall of the cavity and the open side of the cavity which faces outward in FIG. 2. The cavity appears to sustain a transverse-electric operating mode. The tube 6 is of the general type described and claimed in Beggs' Patent No. 2,680,824, assigned to the assignee of the present invention. Specifically a miniature General Electric 7391 disc-seal triode was employed in the illustrated embodiments. Other tube types many be utilized, for example the General Electric 7486, 7768 or 2C40. The miniature tubes in general include cylindrical electrode terminals disposed circumferentially around the tube at various points along the tube length. Cathode electrode terminal 8 extends through the top of the cavity and connects to grounded plate 9 as hereinbefore noted. The anode terminal 26 at the opposite end of the tube is extended through the bottom wall of the cavity for connection to lead 15 and is electrically separated from the cavity bottom wall with an insulated bushing 21. Filament terminal 7 is suitably energized between terminal 50 and grounded terminal 51.

The tube's grid electrode cylinder 22 extends into a recess 23 in the top wall of the cavity, at which point a gap exists between the grid cylinder and the cathode electrode cylinder 8 and plate 9. This gap provides coupling between the tube's circuit and cavity 1 for the purpose of establishing a cavity electric field, and therefore an electromagnetic field, in the cavity. Not only does this gap drive the cavity but also the electromagnetic field distribution in the cavity affects the tube's electron beam and may thereby alter or change the electron beam current as well as the current in the remainder of the tube circuit if changes take place in the said electromagnetic cavity field.

The cavity 1, thus far described, may be denoted the grid-cathode cavity. A second cavity is contained internally of the first cavity in a cap 24 fitted over grid cylinder 22. The cap 24 includes an aperture 25 at the lower end thereof to pass extended anode terminal 26 and is capacitively coupled to the anode terminal without connecting to the same. This smaller second cavity is the grid-anode cavity for the tube and acts principally to determine the frequency at which the circuit operates. The second cavity appears to resonate in a one-quarter wave mode at a frequency in the neighborhood of 2.5 kmc. Feedback sustaining oscillation occurs between the grid-anode cavity and the grid-cathode cavity via R.F. leakage secured along extended anode terminal 26 common to both cavities. The grid-cathode cavity, 1, is tuned by means of a screw 29 extending into cavity 1.

The oscillator circuit is of the grounded grid type, and for this purpose connection is made to cap 24 approximately midway between the broad walls of the cavity at point 27. In the circuit as illustrated, lead 28 connects point 27 to feedthrough insulator 20 and feedthrough insulator 20 is then coupled to ground via relay 16; however, when a relay or utilization circuit is not employed in the grid circuit, the lead 28 may be directly grounded at the side wall of the cavity rather than passing through a feedthrough insulator.

In operation, the oscillator cavity 1 radiates energy in the surrounding region 3 where it may be reflected by an object 5 in FIG. 1 back toward the cavity. The radio frequency wave issuing from open side 2 of the cavity, and flared horn 4, is reflected at object 5 and the reflected wave interferes with the initially propagated wave. A standing wave results extending back into the cavity to the grid-cathode gap of tube 6. Since multiple reflections tend to take place, the operation may be likened to that of a Fabry-Perot interferometer for light. The standing wave may be thought of as an extension of the cavity field; it therefore affects the oscillator feedback and the electron beam passing between cathode and grid within the tube. Accordingly a change is produced in the beam current or space current, which may be readily detected externally of the tube. Inasmuch as the reflected wave so intimately affects the operation of the tube, a considerable change in current can be secured and may directly operate a relay in the grid circuit or anode circuit of the tube.

The tube's grid current decreases considerably and may even decrease to zero when object 5 is located at one-half wave intervals from tube 6. This action is graphically illustrated in FIG. 3a wherein the lower curve is a plot of variation in grid current vs. the position of object 5 away from tube 6. It appears the object 5 may tend to reflect back a short circuit at half-wave intervals similar in effect to energy absorption at these intervals. The upper curve plots changes in anode current vs. the same variable. Although the anode current does not go to zero, it is readily apparent a relay may in the alternative be place in either grid circuit or anode circuit. Such a relay, 16 has been illustrated in the grid circuit of FIGS. 1 and 2. When an object such as object 5 is located at one-half wave intervals, indicated by dips in the curve, the normally open contacts 17 are open. At intervals between the one-half wavelength points, the grid current will close these contacts. The contacts may of course be used to sound an alarm or otherwise give an indication of the presence or movement of object 5. When object 5 is located at one of the half wave points, movement of object 5 by as much as 1/10 wavelength will operate the relay. Therefore the device may be used to detect the buckling of steel sheet or the like on a rolling mill to sound an alarm or shut down the mill.

Region 3 may likewise represent a room wherein the apparatus in accordance with the present invention is employed to detect the intrusion of a human being. In such case the room is filled with R.F. from cavity 1 via horn 4, with the room representing an extension of the oscillator cavity. In this case relay 16 is desirably provided with normally closed contacts which will remain open as long as reflections in the room permit grid current to flow. Then upon the intrusion of a person or foreign object, the grid current will operate to periodically close the relay as the object moves through one-half wave intervals. Of course a normally open relay may be employed if so desired.

The grid circuit of the oscillator may further include a resistor 29, shown dashed in FIGS. 1 and 2, serially interposed between relay operating coil 19 and feedthrough insulator 20. This resistance together with that of the relay coil has an effect upon the grid and plate current swing. The waveforms illustrated in FIG. 3a are for a very small or negligible resistance in the grid circuit. In FIG. 3b this resistance has been raised to 500 ohms. In FIG. 3c the total grid resistance is raised to 1000 ohms. It is seen the change in grid current reduces with increases in grid resistance but the change in anode current increases in FIG. 3c. The change in anode current in FIG. 3c at half-wave intervals is seen to be in the opposite direction from that of FIGS. 3a and 3b. The direction of the anode current deviation is found to reverse as grid resistance passes through approximately 800 ohms, due to the biasing effect of this resistance. Thus a small grid resistance is desirable when the indicating relay is operated by the grid current, but a larger grid resistance is more desirable when such relay is connected in the anode circuit or cathode circuit of the tube.

In FIG. 2 an alternative placement of utilization means in the anode circuit of the tube is shown within dashed lines 31 including a relay 32. The means within dashed lines 31 includes a D.C. current path formed by resistor 33 and variable resistor 34 in series between power supply 10 and point of common reference potential 14, and an A.C. branch circuit thereacross including capacitor 35 in series with the operating coil 36 of a relay 32. Relay 32 is here provided with normally open contacts 37. The introduction of capacitor 35 causes the path including the capacitor and relay 32 to conduct as the anode current is changing. That is relay 32 is energized by alternating current components of anode current. In the operation of the invention as heretofore described, the device has been described as a presence detector, in that the presence of a foreign object is detected, and as a motion detector, in that the motion of such object normally acts to move the relay from a closed to an open position or vice versa. However, in the alternative arrangement including the parallel circuit within dashed lines 31, only the varying component of the oscillator current actuates relay 32. If an object is moving at a steady velocity towards or away from the cavity's output horn, a steady voltage will be provided to relay coil 36. In this case power supply 10 is preferably a direct current supply. The motion detector arrangement is conveniently employed as a moisture detector for a clothes dryer or the like. In this case the inside of the dryer may be thought of as a continuation of the microwave cavity extending to the tube's inter-electrode gap. Dampness of clothes moving in a dryer will continuously operate relay 32 which may be connected to maintain the dryer in an "on" condition. When the clothes are dry, moving reflections are no longer present and therefore relay 32 is permitted to disconnect the dryer. Of course, the circuit 31 may also be employed in a personnel detector or for other purposes. The variable resistance 34 is adjusted to make the apparatus most sensitive for a particular application.

As hereinbefore indicated, a relay such as relay 32 may be included as a D.C. relay in the anode circuit instead of in the grid circuit. In such case capacitor 35 and resistances 33 and 34 are not needed and the apparatus again becomes a presence or position detector. Likewise such relay may be interposed elsewhere in the circuit in the space current path of the tube, for example, between cathode electrode 8 and point of common reference potential 14.

The detector in accordance with the present invention has found additional use in the demonstration of electromagnetic radiation principles and particularly the demonstration of the similarity between microwave and light wave phenomena. FIG. 4 illustrates a plan view of a microwave Michelson's interferometer arrangement. The cavity 1 is the source of radiant energy, here shown without a horn. As in the Michelson's interferometer for light, energy first passes through a half reflecting dielectric mirror 38, here a sheet of Plexiglas, ¼" thick oriented at 45° to the energy path, on to a first adjustable mirror or metal reflector 39 in the path of such radiant energy. The reflector 39 is movable along a scale 40.

Another part of the energy from cavity 1 striking the half reflecting mirror 38 is reflected at the first surface of mirror 38 toward a second mirror 41 comprising another metal reflector. At mirror 41 the energy is perpendicularly reflected straight through the Plexiglas to a crystal detector 42. Crystal detector 42 is mounted on a third metal reflector 43, the crystal detector leads being connected to a D.C. milliammeter 44.

Energy perpendicularly reflected from first mirror 39 arrives at crystal detector 42, after reflection from the remaining surface of half reflecting mirror 38, where it may interefere with microwave energy reaching detector 42 by way of mirror 41. Variations in detected energy from zero to the sum of the energies reaching detector 42 via the two paths may be observed as first reflector 39 is moved along the scale. As reflector 39 is moved, the microwave energy alternately reinforces and cancels at detector 42.

In FIG. 5, there is illustrated a microwave counterpart of Lloyd's mirror, known in light optics. Here adjustable metal reflector 45 is oriented at a 45° angle with respect to cavity 1 and functions to reflect microwave energy to a crystal detector 46 mounted on a second metal reflector 47. Again, detector 46 is connected across a D.C. milliammeter 48. The plane of reflector 47 is disposed at a 45° angle to both first reflector 45 and cavity 1 so that microwave energy arrives at detector 46 both from cavity 1 and reflector 45. As reflector 45 is moved along the central line between cavity 1 and detector 46, reinforcement and cancellation will again take place in the sum of the microwave energy arriving at detector 46 directly and via the reflected path. The total energy impinging on crystal 46 is registered by meter 48.

While I have shown and described particular embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. An apparatus for detecting the presence of an object comprising a rectangular waveguide cavity open on one side thereof and provided with a flared horn for radiating energy towards an object, an electron oscillator tube disposed in said cavity having a grid electrode, a cathode electrode, an anode electrode and an electron beam extending therebetween, said grid electrode and said cathode electrode defining an electrode gap coupled to said cavity, connection means for coupling current to electrodes of said electron tube, and utilization means actuated by the change in said current as energy reflected to said cavity by an object produces a standing wave extending into said cavity and the electrode gap of said electron tube affecting the electron beam traversing said electrode gap to change the said current coupled to said tube.

2. An apparatus for detecting the presence of an object comprising a rectangular first waveguide cavity open on one side thereof and provided with a flared horn for radiating energy towards said object, an electron oscillator tube disposed in said cavity having a grid cylinder electrode, a cathode cylinder electrode, an anode electrode and an electron beam extending therebetween, said grid electrode and said cathode electrode defining an electrode gap coupled to said cavity, a second cavity inside said first cavity including a cylinder coaxial with said grid electrode and said anode electrode extending from said grid electrode for capacitive coupling with said anode electrode, connection means for coupling current to said electron tube, and utilization means actuated by the change in said current as energy reflected to said cavity by an object produces a standing wave extending into said first cavity and the electrode gap of said electron tube affecting the electron beam traversing said electrode gap to change the said current coupled to said tube.

3. An apparatus for detecting the presence of an object comprising a rectangular waveguide cavity open on one side thereof for radiating energy towards an object, an electron oscillator tube disposed in said cavity having a grid electrode, a cathode electrode, an anode electrode and an electron beam extending therebetween, said grid electrode and said cathode electrode defining an electrode gap coupled to said cavity, connection means for coupling current to the grid electrode of said electron tube, and utilization means actuated by the change in said current as energy reflected to said cavity by an object produces a standing wave extending into said cavity and the electrode gap of said electron tube affecting the tube's electron beam to change the current coupled to said grid, said utilization means comprising a relay coupled between said grid electrode and said cathode electrode.

4. An apparatus for detecting the presence of an object comprising a rectangular waveguide cavity open on one side thereof and provided with a flared horn for radiating energy towards an object, an electron oscillator tube disposed in said cavity having a grid electrode, a cathode electrode, an anode electrode and an electron beam extending therebetween, said grid electrode and said cathode electrode defining an electrode gap coupled to said cavity, connection means for coupling current to the grid electrode of said electron tube, and utilization means actuated by the change in said current as energy reflected to said cavity by an object produces a standing wave extending into said cavity and the electrode gap of said electron tube affecting the tube's electron beam to change the said current in said connection means coupled to said grid, said utilization means comprising a relay connected in series between said grid electrode and said cathode electrode; a point of common reference potential connected to said cathode electrode, and an alternating current supply transformer having a primary for connection to a source of alternating current supply and a secondary coupled between said anode electrode and said point of common reference potential.

5. An apparatus for detecting the presence of an object comprising a rectangular waveguide cavity open on one side thereof for radiating energy towards an object, an electron oscillator tube disposed in said cavity having a grid electrode, a cathode electrode, an anode electrode and an electron beam extending therebetween, said grid electrode and said cathode electrode defining an electrode gap coupled to said cavity, connection means for coupling current to the anode electrode of said electron tube, and utilization means actuated by the change in said current as energy reflected to said cavity by an object produces a standing wave extending into said cavity and the electrode gap of said electron tube affecting the tube's electron beam to change the said current coupled to the anode of said tube, said utilization means comprising a relay coupled in series with said anode of said tube.

6. An apparatus for detecting the presence of an object comprising a rectangular waveguide cavity open on one side thereof and provided with a flared horn for radiating energy towards an object, an electron oscillator tube disposed in said cavity having a grid electrode, a cathode electrode, an anode electrode and an electron beam extending therebetween, said grid electrode and said cathode electrode defining an electrode gap coupled to said cavity, connection means for coupling current to electrodes of said electron tube, and utilization means actuated by the change in said current as energy reflected to said cavity by an object produces a standing wave extending into said cavity and the electrode gap of said electron tube affecting the tube's electron beam to change the said current coupled to said tube, a point of common reference potential connected to said cathode electrode, an alternating current supply transformer having a primary for connection to a source of alternating current supply, an anode circuit including a secondary of said transformer coupled between said anode electrode and said point of common reference potential, and a relay coupled in series with said anode circuit.

7. An apparatus for detecting the presence of an object comprising a rectangular waveguide cavity open on one side thereof for radiating energy towards said object, an electron oscillator tube disposed in said cavity having a grid electrode, a cathode electrode, an anode electrode and an electron beam extending therebetween, said grid electrode and said cathode electrode defining an electrode gap coupled to said cavity, connection means for coupling current to the space current path of said electron tube, and utilization means actuated by the change in said current as energy reflected to said cavity by an object produces a standing wave extending into said cavity and the electrode gap of said electron tube affecting the tube's electron beam to change the said current coupled to said tube, means for coupling a source of power to the space current path of said tube including said anode, and a relay coupled for alternating currents between said source of power and said space current path including a capacitor in series with said relay.

8. An apparatus for detecting the presence of an object comprising a rectangular waveguide cavity open on one side thereof and provided with a flared horn for radiating energy towards an object, an electron oscillator tube disposed in said cavity having a grid electrode, a cathode electrode, an anode electrode and an electron beam extending therebetween, said grid electrode and said cathode electrode defining an electrode gap coupled to said cavity, connection means for coupling current to electrodes of said electron tube, and utilization means actuated by the change in said current as energy reflected to said cavity by an object produces a standing wave extending into said cavity and the electrode gap of said electron tube affecting the tube's electron beam to change the said current coupled to said tube, a point of common reference potential connected to said cathode electrode, means for coupling a source of power to the space current path of said tube including said anode electrode and said point of common reference potential, and a relay coupled for alternating currents between said source of power and said space current path including a capacitor in series with said relay.

References Cited by the Examiner
UNITED STATES PATENTS

| | | | |
|---|---|---|---|
| 2,457,997 | 1/1949 | George | 331—64 X |
| 2,530,905 | 11/1950 | Ortusi | 343—12 |
| 2,558,463 | 6/1951 | Reed. | |
| 2,580,155 | 12/1951 | Brannen | 340—258 |
| 2,619,597 | 11/1952 | Mlynczak | 333—83 X |
| 2,622,140 | 12/1952 | Muller. | |
| 2,627,577 | 2/1953 | Barton | 333—83 X |
| 2,646,559 | 7/1953 | Nutzler | 340—258 |
| 2,826,753 | 3/1958 | Chapin | 340—258 |
| 3,031,626 | 4/1962 | Dazey | 331—65 X |
| 3,122,601 | 2/1964 | Williams | 88—14 |
| 3,145,251 | 8/1964 | Woodson | 88—14 |
| 3,161,876 | 12/1964 | Barker. | |

FOREIGN PATENTS

| | | |
|---|---|---|
| 600,701 | 4/1948 | England. |
| 833,901 | 3/1952 | Germany. |
| 875,819 | 5/1953 | Germany. |

NEIL C. READ, *Primary Examiner.*

THOMAS B. HABECKER, *Examiner.*

R. M. GOLDMAN, *Assistant Examiner.*